United States Patent

Kenigsberg et al.

(10) Patent No.: US 8,724,466 B2
(45) Date of Patent: May 13, 2014

(54) PACKET FILTERING

(75) Inventors: Eyal Kenigsberg, Dolev (IL); Michael Gopshtein, Yahud (IL); Nick Ioffe, Bat Yam (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 436 days.

(21) Appl. No.: 12/827,593

(22) Filed: Jun. 30, 2010

(65) Prior Publication Data

US 2012/0002679 A1    Jan. 5, 2012

(51) Int. Cl.
     *H04L 1/00*      (2006.01)

(52) U.S. Cl.
     USPC ........... 370/235; 370/252; 370/419; 370/424; 709/224; 709/225; 709/228

(58) Field of Classification Search
     USPC ......... 370/231, 232, 235, 252, 419, 423, 424; 709/224, 225, 228
     See application file for complete search history.

(56) References Cited

U.S. PATENT DOCUMENTS

| | | | |
|---|---|---|---|
| 5,978,849 A * | 11/1999 | Khanna | 709/227 |
| 5,995,624 A * | 11/1999 | Fielder et al. | 713/169 |
| 7,710,921 B2 | 5/2010 | Matsumoto | |
| 7,729,240 B1 * | 6/2010 | Crane et al. | 370/229 |
| 8,005,009 B2 * | 8/2011 | McKee et al. | 370/253 |
| 2003/0117992 A1 * | 6/2003 | Kim et al. | 370/349 |
| 2003/0226034 A1 * | 12/2003 | Howard et al. | 713/201 |
| 2003/0236995 A1 * | 12/2003 | Fretwell, Jr. | 713/200 |
| 2004/0257999 A1 * | 12/2004 | MacIsaac | 370/252 |
| 2004/0264464 A1 * | 12/2004 | Wong | 370/390 |
| 2005/0175007 A1 * | 8/2005 | Park et al. | 370/390 |
| 2005/0278565 A1 * | 12/2005 | Frattura et al. | 714/5 |
| 2008/0317070 A1 * | 12/2008 | Propp et al. | 370/509 |
| 2010/0110918 A1 * | 5/2010 | Mihaly et al. | 370/252 |
| 2010/0128726 A1 * | 5/2010 | Takakuwa | 370/390 |
| 2010/0205383 A1 * | 8/2010 | Blackmon et al. | 711/149 |
| 2010/0235503 A1 * | 9/2010 | Sitaraman et al. | 709/224 |
| 2010/0268933 A1 * | 10/2010 | Frattura et al. | 713/151 |

* cited by examiner

*Primary Examiner* — Alvin Zhu

(57) ABSTRACT

Ingress and egress port packets for a connection between a first node and second node are mirrored to a mirroring port on a network switch. A count of ingress and egress port packets associated with a handshake process is determined. Duplicate mirrored packets associated with the connection are filtered based at least in part on the count.

14 Claims, 3 Drawing Sheets

PACKET FILTERING

BACKGROUND

In many networks, packet traffic is mirrored to a packet analyzer, a network sniffer, an intrusion prevention system (IPS), or other computer hardware and/or software. Mirroring involves detecting packets, for example, at a switch port on a network switch and then copying (or mirroring) the packets on a mirroring port on the network switch. The mirroring port sends mirrored packets to the packet analyzer, network sniffer, IPS, etc.

BRIEF DESCRIPTION OF DRAWINGS

The following description includes discussion of figures having illustrations given by way of example of implementations of embodiments of the invention. The drawings should be understood by way of example, not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

DETAILED DESCRIPTION

Figure 1:
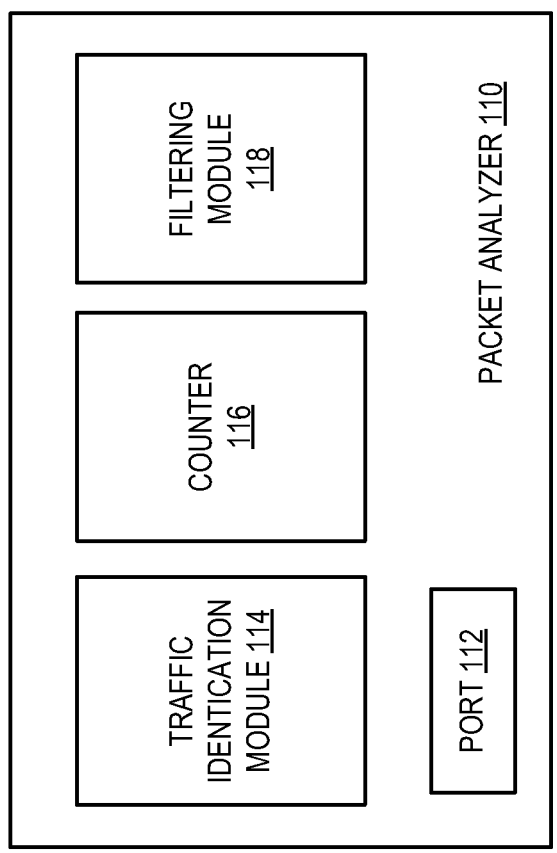
FIG. 1 is a block diagram illustrating a packet analyzer according to various embodiments.

A network switch is a computer networking device that connects network segments. Also called a network bridge, a network switch processes and forwards data at the data link or Ethernet layer, also known as Layer 2 of the Open System Interconnection (OSI) model of computing. Switches that additionally process data at the network layer (Layer 3 and above) are often referred to as Layer 3 or multilayer switches. While many examples herein refer to Ethernet layer functionality, various embodiments described herein are not limited to the Ethernet layer. To this end, the terms "switch" and/or "network switch," as used herein, refer broadly to any type of networking device capable of forwarding packets between network segments. In other words, the switches described herein may perform Layer 2 rocessing, Layer 3 processing or both; they might also perform higher-layer processing as well.

As described herein, a switch may include several ports for connecting various network endpoints (e.g., client, server, etc.). In various embodiments, a switch includes both ingress and egress ports for endpoints connected to the switch. At least one port on the switch is designated as a mirroring port. A mirroring port captures mirrored traffic and sends it to a device connected to the mirroring port. One example of a mirroring port is the SPAN (Switched Port Analyzer) port on switches available from Cisco Systems, Inc. of San Jose, Calif. As mentioned previously, devices connected to a mirroring port can include packet analyzers, network sniffers, IPS devices, etc. For convenience, such devices are referred to herein as mirroring devices even though they may perform a variety of functions (e.g., analyzing, processing, manipulating, altering data, etc.) Mirroring devices may be implemented in hardware or they may be implemented as instructions and/or modules stored on a computer-readable storage medium and executed by a processor.

In many situations, traffic (e.g., packet traffic) is mirrored at the ingress and the egress ports on a switch. In other words, the same packet may be mirrored once at the egress port and then again at the ingress port on the switch. This can result in duplicate packets being seen by the mirroring device. For various reasons, duplicate packets can be problematic. This problem is further complicated by intentional retransmission of packets. For example, packets are occasionally lost during transmission and need to be retransmitted. It can be difficult for a mirroring device to distinguish between duplicate packets and retransmitted packets.

Filtering duplicate packets based on the premise of a unique combination of TCP (Transmission Control Protocol) sequence number and TCP acknowledgment number is insufficient because a retransmitted version of packet X will have the same combination of TCP sequence number (TCP SEQ) and TCP acknowledgement number (TCP ACK) as a duplicate version of packet X.

In IPv4 (Internet Protocol version 4, described in Internet Engineering Task Force RFC 791), duplicate packets and retransmitted packets can be distinguished, despite having the same TCP SEQ and TCP ACK combination, based on an identification field in the packet header. In other words, retransmitted packets have a different identification field value in the IPv4 packet header than the original packet. In contrast, duplicate packets have the same identification value in the IPv4 packet header as the original packet. However, IP version 6 (IPv6) does not include a similar identification field in the packet header. Accordingly, duplicate packets and retransmitted packets cannot be directly distinguished, for example, via a single field (e.g., an identification field) in the packet header in IPv6.

Various embodiments described herein leverage a handshake process (e.g., the TCP three-way handshake) to distinguish duplicate packets from retransmitted packet mirrored to a mirroring device.

FIG. 1 is a block diagram illustrating a packet analyzer 110 according to various embodiments. FIG. 1 includes particular components, modules, etc. according to various embodiments. However, in different embodiments, other components, modules, arrangements of components/modules, etc. may be used according to the teachings described herein. In addition, various components, modules, etc. described herein may be implemented as one or more software modules, hardware modules, special-purpose hardware (e.g., application specific hardware, application specific integrated circuits (ASICs), embedded controllers, hardwired circuitry, etc.), or some combination of these.

Packet analyzer 110 can be any computing device capable of receiving packet traffic from a network. For example, packet analyzer 110 could be a network monitoring device, a network security device, or a host computer that contains executable instructions for implementing embodiments described herein. As shown, packet analyzer 110 includes a port 112, a traffic identification module 114, a counter 116, and a filtering module 118.

Port 112 receives ingress and egress traffic mirrored from ports of a network switch. Traffic identification module 114 identifies mirrored traffic associated with a handshake process for a connection between two endpoints connected on the network switch. For example, traffic identification module 114 might look at packet headers to determine if one or more header fields indicate that a packet is associated with a handshake process. Counter 116 counts packets associated with the handshake process.

While packets are frequently retransmitted once a connection is established between two endpoints, various connection protocols dictate that packets may not be retransmitted if a packet is lost during an attempt to establish a connection (i.e., during a handshake process). Instead, if a packet is lost during the handshake process, the attempted connection fails and a new attempt at a connection must be started. Thus, based on an assumption that packets are not retransmitted during a handshake process, the number of packets associated with a successful handshake process is fixed. Accordingly, depending on the protocol used, a handshake process for a connection between two endpoints might be expected to involve the exchange of N packets. If counter 116 counts N packets during the handshake process, packet analyzer 110 may determine that there are no duplicate packets being mirrored for this connection. In contrast, if counter 116 counts 2N packets (i.e., twice the expected number of packets) during the handshake process, packet analyzer 110 may conclude that it is receiving duplicate packets for the connection (given that packets are not retransmitted during a handshake process).

Filtering module 118 filters packets in view of the packets counted by counter 116 during the handshake process. For example, if counter 116 counts 2N packets during a handshake process where N packets are expected, this means there is exactly one duplicate packet for every real packet on the connection. In view of the actual count and the expected count from the handshake process, filtering module 118 filters the duplicate packets. In the same example where 2N packets are counted during the handshake process where N packets are expected, packet analyzer 110 might subsequently detect three seemingly identical packets on the established connection. Thus, filtering module 118 filters one of the three seemingly identical packets as a duplicate. In other words, the first packet is treated as the original legitimate packet, the second packet is treated as a duplicate, and the third packet is treated as a retransmitted packet (because retransmissions can occur on established connections).

In similar fashion, if counter 116 counts 3N packets during the handshake process where N packets are expected, this might signify two duplicate packets for every real packet. Thus, if three identical packets are detected after establishing the connection, filtering module 118 would filter two of the three identical packets based on the 3N count from the handshake process. By accurately filtering duplicate packets and keeping retransmitted packets, packet analyzer 110 may more accurately analyze network traffic.

Figure 2:
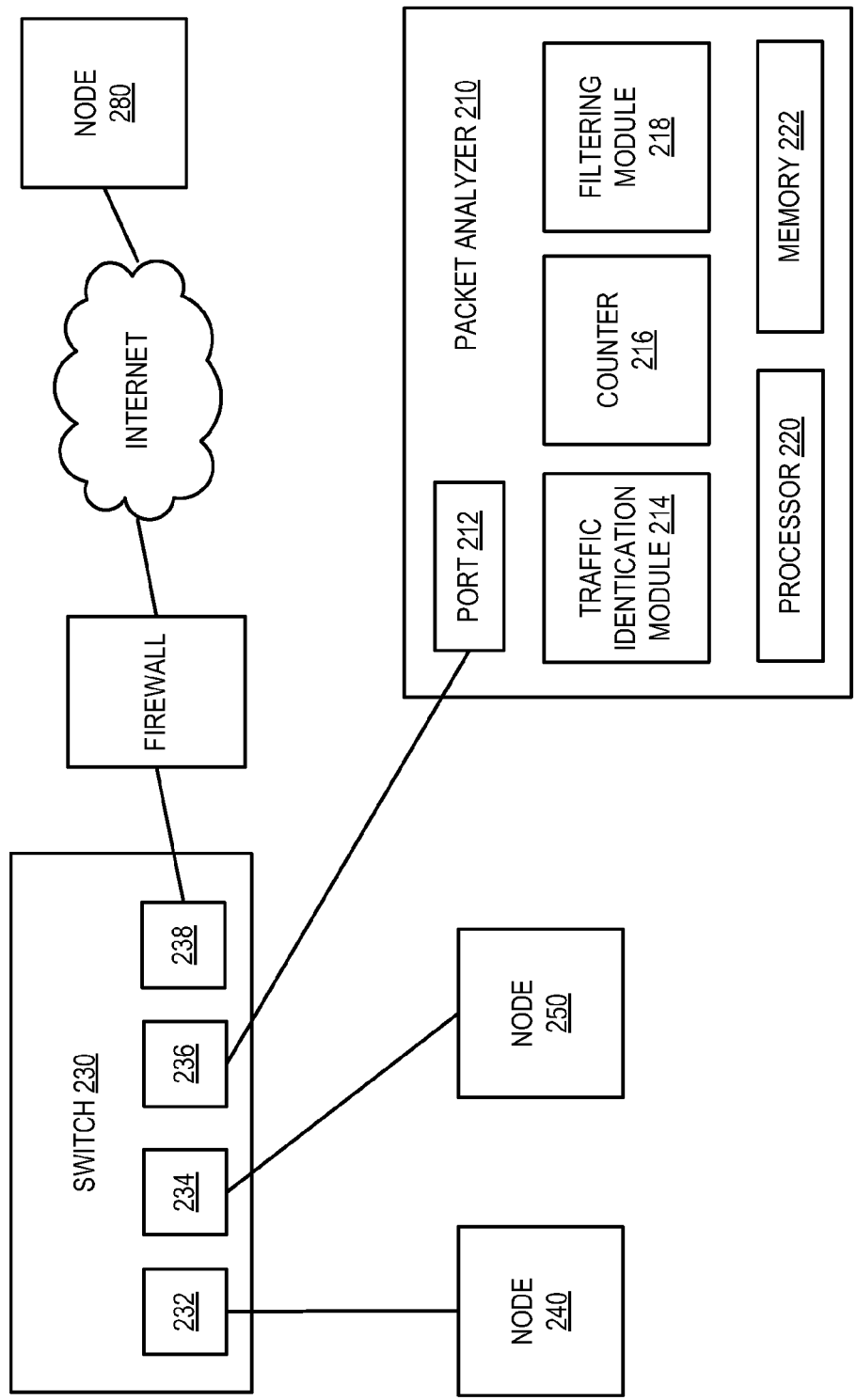
FIG. 2 is a block diagram illustrating a system according to various embodiments.

FIG. 2 illustrates a system according to various embodiments. FIG. 2 includes particular components, modules, etc. according to various embodiments. However, in different embodiments, other components, modules, arrangements of components/modules, etc. may be used according to the teachings described herein. Various components, modules, etc. described herein may be implemented as one or more software modules, hardware modules, special-purpose hardware (e.g., application specific hardware, application specific integrated circuits (ASICs), embedded controllers, hardwired circuitry, etc.), or some combination of these. In addition, functions and/or operations performed by various components, modules, etc. may be embodied as instructions executable by a processor (e.g., processor 220) and stored in a computer-readable storage medium (e.g., memory 222).

Switch 230 includes various switch ports 232-238. Switch port 236 is a mirroring port that mirrors traffic detected on the other ports of switch 230 to packet analyzer 210. In particular, switch 230 mirrors traffic from nodes 240, 250 and 280 to packet analyzer 210. In one example, nodes 240 and 250 have an established connection (e.g., TCP/IP connection) and communicate using the IPv6 protocol. Given the connection, node 240 sends a packet to node 250. In this example, switch 230 mirrors both ingress and egress traffic through port 236 to packet analyzer 210. Accordingly, switch 230 detects the packet transmission from node 240 at port 232 and mirrors the packet to port 236. Switch 230 also detects the arrival of the packet at port 234 en route to node 250 and mirrors the packet again to port 236. Thus, the process of transmitting the packet from node 240 to node 250 results in switch 230 mirroring the packet twice to port 236. Packet analyzer 210 therefore receives a duplicate packet. However, because the IPv6 protocol does not include a unique identification field in the header of each IP packet to distinguish duplicate packets from retransmitted packets, packet analyzer 210 analyzes packets during a handshake process to distinguish duplicate packets from retransmitted packets, which is described in more detail below. It should be noted that the IPv6 protocol is used herein merely by way of example. Embodiments described herein could also employ other protocols including, but not limited to, IPv4 and other Internet Layer protocols.

To distinguish duplicate packets from retransmitted packets, packet analyzer 210 analyzes the handshake process associated with establishing new connections (e.g., TCP/IP connections). Using the example above, when nodes 240 and 250 first attempt to establish a connection between each other, a three-way handshake is initiated by one of the nodes. Assuming node 250 initiates the handshake, node 250 sends a segment to node 240 with the SYN (Synchronization) flag set to 1 and the ACK (Acknowledgement) flag set to 0. This announces an attempt to open a connection. This segment header also includes an ISN (initial sequence number) for node 250. Node 240 receives the segment from node 250 and returns a segment with the SYN flag set to 1 (indicating communication is still in the synchronization phase) and the ACK flag set to 1 (indicating that the acknowledgment field will include a number). The segment sent by node 240 includes the ISN for node 240 and an acknowledgment number M+1, where M is the last sequence number received from node 250. Finally, node 250 sends a segment to node 240 that acknowledges receipt of the ISN for node 240. This segment has the SYN flag set to 0 and the ACK flag set to 1. The segment includes the next sequence number (M+1) and an acknowledgement number N+1, where N is the last sequence number received from node 240. Following receipt of the last segment by node 240, a connection is established between nodes 240 and 250.

In various embodiments, port 212 receives ingress and egress traffic mirrored through port 236. Traffic identification module 214 identifies mirrored packets associated with the handshake process described above (or similar handshake process). In certain embodiments, traffic identification module 214 identifies packets associated with the synchronization phase of the handshake process (e.g., SYN flag is set to 1). Traffic identification module 214 may additionally distinguish traffic associated with the handshake process by source and/or destination address. For example, in the case of establishing a connection between node 240 and node 250, each node sends a single synchronization-phase packet. Traffic identification module 214 not only identifies the synchronization phase packets but distinguishes them by source and/or destination address. Additionally, traffic identification module 214 distinguishes between synchronization packets associated with different connections (e.g., distinguishes between a first handshake process involving nodes 240 and 250 and a second handshake process involving nodes 250 and 280).

Counter 216 counts packets associated with a handshake process based on the information identified by traffic identification module 214. In this way, counter 216 is able to count the number of packets associated with a particular handshake process (e.g., a connection attempt between nodes 240 and 250). In various embodiments, counter 216 counts the synchronization-phase packets associated with a particular handshake process.

Filtering module 218 filters packets based on the information obtained by traffic identification module 214 and counter 216 during the handshake process. For example, in a TCP handshake, it is expected that there will be two synchronization-phase packets transmitted (i.e., one from each node). It is assumed that packets are not retransmitted during a handshake—if a packet fails to reach its destination during the handshake, the connection attempt fails and a new connection attempt must be started. Accordingly, if packet analyzer 210 receives two synchronization-phase packets for a particular connection (i.e., during the handshake process), then filtering module 218 knows that future mirrored packets associated with the connection will not include duplicates. Thus, filtering module 218 treats any packets (associated with that connection) that might otherwise appear to be duplicate packets as retransmitted packets (i.e., such packets are not filtered). In contrast, if packet analyzer 210 receives four synchronization-phase packets for a particular connection (i.e., during the handshake process), then filtering module 218 knows that every legitimate packet received by packet analyzer 210 will be accompanied by a duplicate packet (i.e., because two synchronization packets were expected and 2 extra packets were received). Filtering module 218 filters the duplicate packets (e.g., by filtering one of two packets having the same sequence number and the same ACK number). The relationship between synchronization-phase packet counts and filtering of duplicates can be extended to multiples of the expected synchronization-phased packet count. In other words, any indication of a handshake packet count (and, in particular, a synchronization-phase packet count) that exceeds the expected count (by a multiple of the expected count) triggers duplicate packet filtering by filtering module 218.

Figure 3:
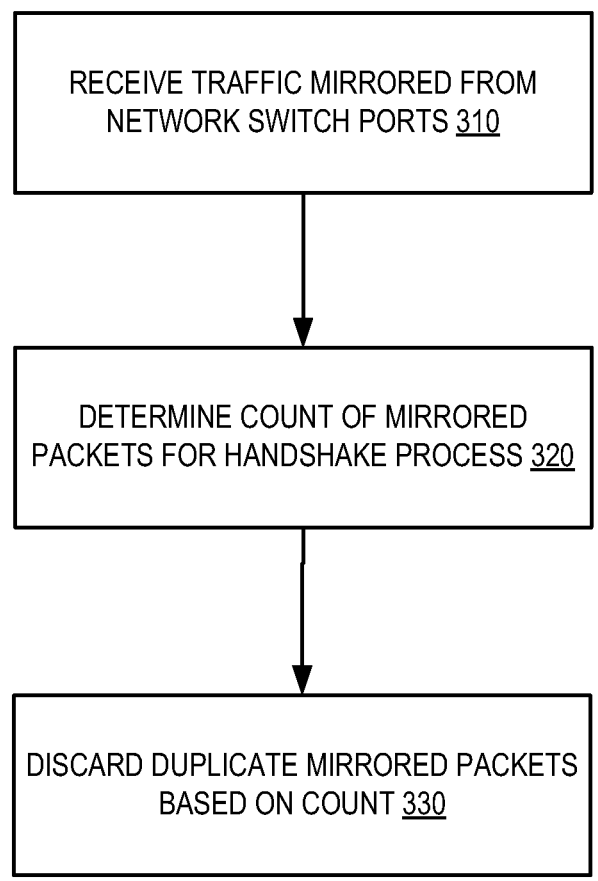
FIG. 3 is a flow diagram of operation in a system according to various embodiments.

FIG. 3 includes particular operations and execution order according to certain embodiments. However, in different embodiments, other operations, omitting one or more of the depicted operations, and/or proceeding in other orders of execution may also be used according to teachings described herein.

A computing device (e.g., a packet analyzer) receives 310 ingress and egress traffic mirrored on ports of a network switch via a mirroring port on the network switch. The device determines 320 the number of packets mirrored via the mirroring port as part of handshake process for a connection between two entities. In various embodiments, the number of packets associated with a handshake process (and, in particular, the synchronization-phase of the handshake process) is fixed based at least in part on an assumption that nodes do not retransmit packets during a handshake process. Thus, if the number of packets counted during a handshake between two entities (i.e., two nodes, endpoints, etc.) exceeds the fixed and/or expected number for the handshake process, the device discards 330 those mirrored packets that are duplicates.

Various modifications may be made to the disclosed embodiments and implementations of the invention without departing from their scope. Therefore, the illustrations and examples herein should be construed in an illustrative, and not a restrictive sense.

The invention claimed is:

1. A method, comprising:
   receiving ingress and egress traffic mirrored on ports of a network switch via a mirroring port on the network switch;
   determining a count of packets mirrored via the mirroring port as part of a handshake process for a connection between two entities; and
   filtering duplicate mirrored packets associated with the connection based at least in part on the count.

2. The method of claim 1, wherein determining the count comprises:
   counting the number of synchronization-phase packets sent during the handshake process.

3. The method of claim 2, wherein counting the number of synchronization-phase packets comprises:
   counting the number of synchronization-phase packets sent from a first entity during the handshake process; and
   counting the number of synchronization-phase packets sent from a second entity during the handshake process.

4. The method of claim 1, further comprising:
   determining a count of retransmitted packets associated with the connection in view of the duplicate mirrored packets.

5. The method of claim 1, wherein mirroring traffic to a mirroring port further comprises:
   mirroring traffic to a packet analyzer connected to the mirroring port.

6. The method of claim 1, in which the handshake process is a transmission control protocol (TCP) three-way handshake.

7. The method of claim 1, further comprising:
   distinguishing retransmitted packets from the duplicate mirrored packets; and
   retaining a number of the retransmitted packets.

8. An apparatus, comprising:
   a port to receive ingress and egress traffic mirrored to a mirroring port from ports of a network switch;
   a traffic identification module to identify mirrored traffic associated with a handshake process for a connection between two endpoints connected with the network switch;
   a counter to count packets associated with the handshake process; and
   a filtering module to filter packets based at least in part on the count of packets associated with the handshake process.

9. The apparatus of claim 8, the traffic identification module further to identify synchronization-phase packets sent from a first source during the handshake process and to identify synchronization-phase packets sent from a second source during the handshake process.

10. The apparatus of claim 9, the counter further to produce a first count of synchronization-phase packets sent from the first source and a second count of synchronization-phase packet sent from the second source.

11. The apparatus of claim 8, the filtering module further to distinguish between duplicate packets and retransmitted packets based at least in part on the count of packets associated with the handshake process.

12. A non-transitory computer-readable storage medium containing instructions that, when executed, cause a computer to:
   determine a count of ingress and egress port packets associated with a handshake process or a connection between a first node and a second node, wherein the ingress and egress port packets are mirrored to a mirroring port on a network switch; and filtering duplicate mirrored packets associated with the connection based at least in part on the count.

13. The non-transitory computer-readable storage medium of claim 12, wherein the count includes a first source count for packets having a first source address and a second source count for packets having a second source address.

14. The non-transitory computer-readable storage medium of 13, containing further instructions that cause the computer to:

determine that a packet sent from the first source address is a retransmitted packet if the packet has a sequence number and an acknowledgement number that are included in a previous packet sent from the first source address and if the total number of packets sent from the first source having the packet sequence number and the acknowledgement number exceeds the first source count.

* * * * *